United States Patent Office 3,372,146
Patented Mar. 5, 1968

3,372,146
POLYACETAL TERPOLYMERS CONTAIN-
ING RANDOMLY RECURRING GROUPS
DERIVED FROM A DICARBONAL
Henri Sidi, Paramus, N.J., assignor to Tenneco Chemicals,
Inc., a corporation of Delaware
No Drawing. Filed Aug. 12, 1964, Ser. No. 389,196
11 Claims. (Cl. 260—67)

ABSTRACT OF THE DISCLOSURE

Certain isomeric dicarbonals may be copolymerized with formaldehyde or with its cyclic trimer, trioxane, to form a new class of polyacetal copolymers and terpolymers which contain randomly recurring groups derived from the isomeric dicarbonals. These new polyacetal copolymers and terpolymers are characterized by viscosimetrically-determined average molecular weights in the range from 10,000 to 100,000, and by excellent thermal and hydrolytic stability.

---

This invention relates to formaldehyde copolymers and, more particularly, to a new class of high molecular weight interpolymers of formaldehyde (or trioxane) and certain dicarbonals, as well as to the process by which these interpolymers are prepared. These new copolymers or interpolymers, the terms being interchangeably used, are particularly suitable for molding applications, and may be fabricated into films, filaments, fibers, rods and tubes. The new copolymers of the invention are characterized by excellent thermal and hydrolytic stability and in many ways are more stable than any commercially available homopolymer or copolymer of formaldehyde.

The new class of copolymers has been prepared by interpolymerizing monomeric formaldehyde or its cyclic trimer, trioxane, with a mixture of isomeric dicarbonals having structures represented by the formulas (I) 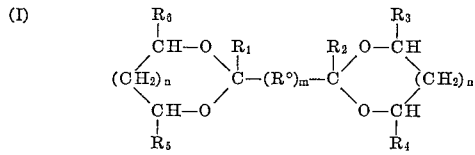

and (II) 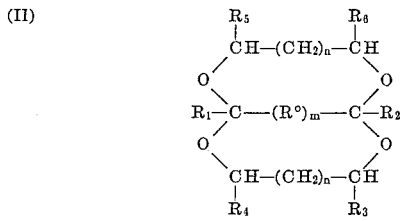

in both of which structures $R°$ represents a divalent radical which may be either an alkylene, substituted-alkylene, arylene, or aralkylene; $R_1$ and $R_2$ represent either hydrogen, alkyl groups containing 1 to 4 carbon atoms, phenyl, or halo-substituted phenyl; $R_3$, $R_4$, $R_5$ and $R_6$ represent either hydrogen, alkyl groups containing 1 to 12 carbon atoms, aryl, or aralkyl; $m$ is an integer from 0 to 3; and $n$ is an integer from 0 to 1.

Structurally, these new copolymers contain recurring oxymethylene groups (—OCH$_2$—) interspersed with recurring groups derived from the tetrafunctional dicarbonal and having randomly variant structures depending upon which carbonal carbon atom was initially attacked during the interpolymerization reaction. By way of illustration, one of these recurring groups probably possesses the tetrafunctional structure

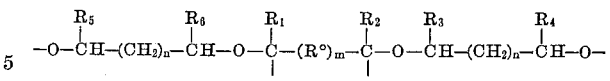

to which structure may be linked branched chains of recurring oxymethylene groups (—OCH$_2$—), or other oxyalkylene groups, or other groups derived from the dicarbonal. Because of the tetrafunctionality of the isomeric dicarbonals, it is virtually impossible to unequivocally characterize these new copolymers structurally. The branched chains of the copolymer molecule may be terminated by hydroxyl groups, by ether groups, by carboxylate groups, by cyanoethyl groups, or by other end groups. Alternatively, two or more of these branched chains may be joined to form cross-linked molecules.

The isomeric dicarbonals which are employed to prepare the new class of copolymers are themselves prepared by reacting a dicarbonyl compound, (which is either a dialdehyde, a diketone or a ketoaldehyde) having the following structure

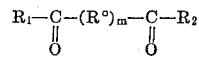

with a vicinal glycol or a 1,3-diol, thereby forming either a diacetal, a diketal or a ketal-acetal, depending upon the structure of the dicarbonyl compound. As used herein, therefore, the term "dicarbonal" generically denotes those isomeric diacetals, diketals and ketal-acetals formed by reacting the corresponding dicarbonyl compound with either a vicinal glycol or a 1,3-diol. In all probability, both isomers I and II are formed during the reaction of the dicarbonyl compound and the diol, although isomer I probably predominates.

Among the isomeric dicarbonals which may be used to prepare the new copolymers of the invention are those prepared from glyoxal, pyruvaldehyde, glutaraldehyde, malonaldehyde, and benzil with such diols as ethylene glycol, 1,2-propanediol, 1,3-propanediol, 1,3-butanediol, 2,3-butanediol, neopentyl glycol, pinacol, and 11,12-dihydroxytetracosane. More particularly, these dicarbonals include such compounds as glyoxal-bis-(ethylene glycol acetal), glyoxal-bis-(1,2-propanediol acetal), glyoxal-bis-(1,3-propanediol acetal), glyoxal-bis-(1,3-butanediol acetal), glyoxal-bis-(2,3-butanediol acetal), glyoxal-bis-(2,4-pentanediol acetal), glyoxal-bis-(neopentyl glycol acetal), glyoxal-bis-(1-n-decyl-2-n-dodecylethylene glycol acetal), pyruvaldehyde-bis-(ethylene glycol acetal), pyruvaldehyde-bis-(1,3-propanediol acetal), malonaldehyde-bis-(ethylene glycol acetal), glutaraldehyde-bis-(ethylene glycol acetal) benzil-bis-)ethylene glycol acetal), and mixtures thereof. The common names of each of the aforementioned dicarbonals has been used, rather than Geneva nomenclature, since each compound probably represents a mixture of two isomers.

A wide range of molar proportions of the dicarbonal may be incorporated in the copolymer, depending upon the particular properties which are desired in the resultant copolymer. By way of illustration, particularly satisfactory molding properties may be obtained in those copolymers having a molecular weight in the range between about 10,000 and about 100,000 and containing from about 0.01 to about 7 percent by weight, based on the weight of the copolymer, of the tetrafunctional group derived from the dicarbonal. Since the use of the dicarbonal in the polymer necessarily results in some crosslinking, the stability and processing characteristics of these copolymers are dependent upon the amount of dicarbonal incorporated into the polymer structure. For example, the inclusion of as little as 0.01 percent by weight (based on the weight of the polymer) of the tetrafunctional unit derived from the dicarbonal is sufficient to improve the corresponding homopolymer or copolymer containing oxyalkylene and oxymethylene units. In most instances, the presence of more than about 7 percent by weight of the tetrafunctional unit derived from the dicarbonal in the polymer structure results in a product which is so cross-linked that it no longer possesses the rheological properties of a thermoplastic resin. To retain thermoplasticity, the copolymer should possess a molecular weight in the range from about 10,000 to about 100,000 and contain from about 0.05 to about 4 percent by weight (based on the weight of the polymer) of the recurring tetrafunctional unit derived from the dicarbonal.

Either monomeric formaldehyde or its trimer, trioxane, may be used to prepare the new copolymers of the invention. To obtain polymer products having the desired properties, however, the monomeric formaldehyde or trioxane should be substantially anhydrous, that is, contain less than 0.5 percent and preferably less than 0.1 percent by weight of water.

The interpolymerization of monomeric formaldehyde or trioxane and the dicarbonal may be conducted at a temperature in the range from about 0° C. to about 100° C. (and preferably from 20° C. to 70° C.) in the presence or in the absence of a formaldehyde polymerization initiator, which functions to catalyze the copolymerization reaction. When used, the formaldehyde polymerization initiator is generally employed in an amount in the range from about 0.001 to about 5 percent and, preferably, from 0.01 to 0.5 percent by weight, based on the weight of monomermic formaldehyde or trioxane which undergoes reaction.

Any of the well known formaldehyde polymerization initiators can be used in the process of the invention, including aliphatic amines, hydroxypolyamines, phosphines, arsines, stilbenes, organometallic compounds, and boron trifluoride compounds, particularly when monomeric formaldehyde is the formaldehyde source. When trioxane is used as the source of recurring oxymethylene groups, best results have been obtained using as the initiator either boron trifluoride or a boron trifluoride coordinate complex with an organic compound in which oxygen or sulfur is the donor atom. The coordinate complex of boron trifluoride may be, for example, a complex with an alcohol, a phenol, an acid, an ether, an acid anhydride, an ester, a ketone, an aldehyde, a dialkyl sulfide, or a mercaptan. Particularly useful as initiators are boron trifluoride diethyl etherate and boron trifluoride di-n-butyl etherate.

The interpolymerization of monomeric formaldehyde or trioxane and the dicarbonal is usually carried out in a reaction medium which remains liquid under the polymerization conditions employed. Suitable reaction media include hydrocarbons containing 3 to 10 carbon atoms per molecule, such as propane, hexane, decane, cyclohexane, toluene, xylene, and decahydronaphthalene; esters, such as methylene diacetate and methylene dipropionate (the use of both of which is described in the copending application of Henri Sidi, Ser. No. 133,783, filed Aug. 25, 1961, now United States Letters Patent No. 3,219,630); hydrocarbon halides; and ethers. As a general rule, the amount of the reaction medium used is within the range of 1 part to 1000 parts and in most cases 1 part to 100 parts by weight per part by weight of the comonomers.

The interpolymerization reaction may be carried out in any convenient manner. For example, anhydrous monomeric formaldehyde or trioxane may be introduced into a reactor containing the reaction medium, the dicarbonal, and the formaldehyde polymerization initiator. Alternatively, the formaldehyde polymerization initiator may be added to a mixture of the comonomers in the reaction medium or the formaldehyde (or trioxane), dicarbonal, and formaldehyde polymerization initiator may be added simultaneously to the reaction medium. In either case, the copolymerization reaction may be carried out as a batchwise process or as a continuous process.

In addition to recurring oxymethylene groups and the recurring groups derived from the dicarbonal, the new polymers of the invention may also contain other recurring structural groups, particularly oxyalkylene groups having at least two carbon atoms, in which event the resultant polymer is a terpolymer. Oxyethylene and substituted oxyethylene groups are especially desirable and may be incorporated into the polymer structure by including in the reaction mixture the desired amount of a cyclic ether having the structure

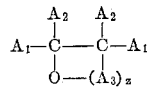

in which $A_1$ and $A_2$ represent hydrogen, alkyl groups having from 1 to 3 carbon atoms, or halogen substituted alkyl groups having from 1 to 3 carbon atoms; $A_3$ represents methylene, oxymethylene, lower alkyl or haloalkyl substituted methylene, oxymethylene, lower alkyl or haloalkyl substituted oxymethylene groups; and $z$ represents an integer in the range of 0 to 3. Illustrative of these cyclic ethers are ethylene oxide and 1,3-dioxolane. When incorporated in the polymer, the oxyalkylene groups may comprise from about 0.1 to about 15 percent and, preferably, from 0.2 to 3 percent by weight of the weight of the terpolymer. Moreover, when oxyalkylene groups are incorporated in the polymer structure, then the combined weight of the oxyalkylene groups and the groups derived from the dicarbonal should not exceed 20 percent of the weight of the terpolymer.

Since the rates at which the dicarbonal and the cyclic ether undergo interpolymerization are somewhat lower than the rates at which monomeric formaldehyde or trioxane react under the interpolymerization reaction conditions, it is frequently necessary to use excess amounts of these comonomers during the polymerization reaction so that the desired amount may be incorporated within the polymer structure. For example, the incorporation within the polymer structure of from about 0.01 to about 7 percent by weight (based on the weight of the polymer) of recurring groups from the dicarbonal usually requires the use in the polymerization reaction of from about 0.05 to about 20 percent by weight (based on the weight of the formaldehyde source) of the dicarbonal, while the incorporation of from about 0.05 to about 4 percent by weight of recurring groups derived from the dicarbonal usually requires from about 0.1 to about 10 percent by weight of the dicarbonal in the polymerization reaction, based on the weight of the formaldehyde source. Similarly, the incorporation of from about 0.1 to about 25 percent by weight, based on the weight of the polymer, of recurring oxyalkylene groups derived from a cyclic ether usually requires the use in the polymerization reaction of from about 0.5 to about 25 percent by weight of the cyclic ether, based on the weight of the monomeric formaldehyde or trioxane employed in the process.

The formation of the polymers (copolymers and terpolymers) of the present invention is best effected under non-oxidizing conditions. A convenient way of obtaining such conditions involves sweeping the reactor with a dry inert gas, such as nitrogen, and carrying out the copolymerization under a blanket of the inert gas. In addition an antioxidant may be present during the reaction and/or may be added to the product to reduce oxidative effects. Among the antioxidants that are useful for this purpose are phenothiazine, 2-mercapto-benzimidazole, diphenylamine, phenyl-α-naphthylamine, bis-(β-naphthylamino)-p-phenylenediamine, 4,4' - butylene- bis - (3-methyl-6-t-butylphenol), and 5-ethyl-10,10-diphenylphenazasiline. The amount of antioxidant used is approximately 0.01 percent to 1 percent based on the weight of the comonomers.

To prevent degradation of the copolymer resulting from prolonged contact with the polymerization initiator, it is generally desirable to remove or neutralize the initiator upon completion of the polymerization step. When boron trifluoride or a boron trifluoride coordinate complex is used as the initiator, the reaction mixture may be treated with an alkaline material, for example, an aliphatic amine, such as tri-n-butylamine, or an alkali metal salt of an alkanoic acid having from 1 to 18 carbon atoms, to neutralize the initiator. Other initiators may be removed by washing the reaction mixture with water or a suitable organic solvent.

Because improved thermal stability of the polymers may be obtained by using an after-treatment that entails blocking or "capping" of the terminal hydroxyl groups of the polymer chains, it is frequently desirable (though not essential) to chemically stabilize the resultant polymer by acylation, etherification, cyanoethylation, or other such procedures. Alternatively, the raw polymer may be subjected to the controlled degradation (or partial depolymerization) of the polymer chain, for example, by heating or by washing with an alkaline solution, until a terminal group is reached that is inert to further chemical or physical degradation. Excellent results have been obtained by heating the raw polymer to a temperature in the range from about 140° C. and about 220° C. with cyanoguanidine and a phenolic antioxidant to improve its thermal stability.

The following examples are illustrative of the ease with which formaldehyde or trioxane may be copolymerized with a dicarbonal to prepare the new polymers of the invention:

Example I

A mixture of 392 grams of trioxane, 9.8 grams of glyoxal-bis-(ethylene glycol acetal), 170 grams of cyclohexane, and 0.12 ml. of boron trifluoride diethyl etherate was stirred and heated at a temperature in the range of 47° C. to 60° C. for 20 minutes. The reaction mixture was washed with 1000 ml. of acetone that contained 2 ml. of tributylamine and then with 1000 ml. of cold water, with 1000 ml. of water at 70° C., and finally with two 1000 ml. portions of acetone. The product was then dried under vacuum at 65° C., yielding 154 grams of a trioxane/glyoxal-bis-(ethylene glycol acetal) copolymer having an average molecular weight of 54,000, as determined viscosimetrically. The copolymer was subjected to acid hydrolysis under conditions which degraded the tetrafunctional units derived from the glyoxal-bis-(ethylene glycol acetal) to glyoxal and ethylene glycol. Isolation of the glyoxal as its 2,4-dinitrophenylhydrazone, as well as analysis by vapor phase chromatography indicated that the mixture of products which was obtained from the hydrolytic degradation of the copolymer contained 0.56 percent by weight of glyoxal and 1.51 percent by weight of ethylene glycol, from which it was calculated that the copolymer contained approximately 2 percent of

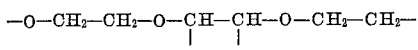

units derived from glyoxal-bis-(ethylene glycol acetal).

Example II

A mixture of 392 grams of trioxane, 7.3 grams of glyoxal-bis-(ethylene glycol acetal), 170 grams of cyclohexane, and 0.12 ml. of boron trifluoride diethyl etherate was stirred and heated at a temperature in the range of 47° C. to 60° C. for 50 minutes. The resultant product was washed and dried by the procedure described in Example I to yield 213 grams of trioxane/glyoxal-bis-(ethylene glycol acetal) copolymer that had an average molecular weight of 52,800, as determined viscosimetrically. Isolation of glyoxal as the 2,4-dinitrophenylhydrazone and vapor phase chromatographic analysis of the ethylene glycol indicated that the mixture of products obtained from the hydrolytic degradation of the copolymer contained 0.47 percent by weight of glyoxal and 1.28 percent by weight of ethylene glycol.

Example III

A mixture of 392 grams of trioxane, 20 grams of glyoxal-bis-(ethylene glycol acetal), 170 grams of cyclohexane, and 0.12 ml. of boron trifluoride diethyl etherate was stirred and heated at a temperature in the range of 47° C. to 60° C. for 20 minutes. The resulting copolymer was washed and dried by the procedure described in Example I to yield 194 grams of trioxane/glyoxal-bis-(ethylene glycol acetal) copolymer that had an average molecular weight of 67,600, as determined viscosimetrically. Isolation of glyoxal as the 2,4-dinitrophenylhydrazone and vapor phase chromatographic analysis of the ethylene glycol indicated that the mixture of products obtained from the hydrolytic degradation of the copolymer contained 0.70 percent by weight of glyoxal and 2.83 percent by weight of ethylene glycol.

Example IV

A mixture of 392 grams of trioxane, 2.45 grams of glyoxal-bis-(ethylene glycol acetal), 170 grams of cyclohexane, and 0.12 ml. of boron trifluoride diethyl etherate was stirred and heated at a temperature in the range of 47° C. to 60° C. for 15 minutes. The resulting copolymer was washed and dried by the procedure described in Example I to yield 204 grams of a trioxane/glyoxal-bis-(ethylene glycol acetal) copolymer that had a molecular weight of 64,900, as determined viscosimetrically. Isolation of glyoxal as the 2,4-dinitrophenylhydrazone and vapor phase chromatographic analysis of the ethylene glycol indicated that the mixture of products obtained from the hydrolytic degradation of the copolymer contained 0.15 percent by weight of glyoxal and 0.37 percent by weight of ethylene glycol.

Example V

A mixture of 392 grams of trioxane, 10 grams of glyoxal-bis-(1,3-propanediol acetal), 170 grams of cyclohexane, and 0.12 ml. of boron trifluoride diethyl etherate was stirred and heated at a temperature in the range of 47° C. to 70° C. for 23 minutes. The resulting copolymer was washed and dried by the procedure described in Example I to yield 204 grams of a trioxane/glyoxal-bis-(1,3-propanediol acetal) copolymer that had an average molecular weight of 54,400, as determined viscosimetrically. Isolation of glyoxal as the 2,4-dinitrophenylhydrazone and vapor phase chromatographic analysis of the 1,3-diol indicated that the mixture of products obtained from the hydrolytic degradation of the copolymer contained 0.73 percent by weight of glyoxal and 0.89 percent by weight of 1,3-propanediol.

Example VI

A mixture of 392 grams of trioxane, 10 grams of pyruvaldehyde-bis-(ethylene glycol acetal), 170 grams of cyclohexane and 0.12 ml. of boron trifluoride diethyl etherate was stirred and heated at a temperature in the range of 47° C. to 65° C. for 55 minutes. The resulting copolymer was washed and dried by the procedure described in Example I to yield 187 grams of a trioxane/pyruvaldehyde-bis-(ethylene glycol acetal) copolymer that had an average molecular weight of 12,900, as determined viscosimetrically. Isolation of pyruvaldehyde as the 2,4-dinitrophenylhydrazone and vapor phase chromatographic analysis of the glycol indicated that the mixture of products obtained from the hydrolytic degradation of the copolymer contained 0.22 percent by weight of pyruvaldehyde and 1.42 percent by weight of ethylene glycol.

Example VII

A mixture of 392 grams of trioxane, 10 grams of malonaldehyde-bis-(ethylene glycol acetal), 170 grams of cyclohexane, and 0.62 ml. of boron trifluoride diethyl etherate was stirred and heated at a temperature in the range of 47° C. to 65° C. for 180 minutes. The resulting copolymer was washed and dried by the procedure described in Example I to yield 57 grams of a trioxane/malonaldehyde-bis-(ethylene glycol acetal) copolymer that had an average molecular weight of approximately 10,000, as determined viscosimetrically. Isolation of malonaldehyde as the 2,4-dinitrophenylhydrazone and vapor phase chromatographic analysis of the glycol indicated that the mixture of products obtained from the hydrolytic degradation of the copolymer contained 0.826 percent by weight of malonaldehyde and 3.02 percent by weight of ethylene glycol.

*Example VIII*

A mixture of 392 grams of trioxane, 5 grams of glutaraldehyde-bis-(ethylene glycol acetal), 170 grams of cyclohexane, and 0.12 ml. of boron trifluoride diethyl etherate was stirred and heated at a temperature in the range of 47° C. to 65° C. for 55 minutes. The resulting copolymer was washed and dried by the procedure described in Example I to yield 202 grams of a trioxane/glutaraldehyde-bis-(ethylene glycol acetal) copolymer that had an average molecular weight of approximately 10,000, as determined viscosimetrically. Isolation of glutaraldehyde as the 2,4-dinitrophenylhydrazone and vapor phase chromatographic analysis of the glycol indicated that the mixture of products obtained from the hydrolytic degradation of the copolymer contained 0.424 percent by weight of glutaraldehyde and 1.14 percent by weight of ethylene glycol.

*Example IX*

A mixture of 1700 grams of trioxane, 8.0 grams of glyoxal-bis-(ethylene glycol acetal), 41.2 grams of 1,3-dioxolane, and 700 grams of cyclohexane was heated to 50° C. After the addition of 0.52 ml. of boron trifluoride diethyl etherate, the reaction mixture was stirred and heated at 69° C. to 74° C. for 30 minutes. The resulting terpolymer was washed with 1500 ml. of acetone that contained 10 ml. of tributyl amine and then with 750 ml. of cold water, 2000 ml. of water at 90° C., and finally with two 1500 ml. portions of acetone. The product was dried under vacuum at 60° C. There was obtained 1433 grams of a trioxane/glyoxal-bis-(ethylene glycol acetal)/1,3-dioxolane terpolymer that had an average molecular weight of 22,500, as determined viscosimetrically. Isolation of glyoxal as the 2,4-dinitrophenylhydrazone and vapor phase chromatographic analysis indicated that the mixture of products obtained from the hydrolytic degradation of the terpolymer contained 1.98 percent by weight of ethylene glycol and 0.74 percent by weight of glyoxal.

Two hundred grams of the terpolymer, 2500 grams of dimethylformamide, and 1.0 gram of cyanoguanidine were heated at 141–150° C. for 1 hour. The reaction mixture was filtered, and the solid terpolymer was washed with acetone, with hot water, with cold water, and again with acetone and dried under vacuum. There was obtained 165 grams of a stabilized terpolymer.

*Example X*

A mixture of 1700 grams of trioxane, 1.0 gram of glyoxal-bis-(ethylene glycol acetal), 35.8 grams of 1,3-dioxolane, and 700 grams of cyclohexane was heated to 50° C. After the addition of 0.52 ml. of boron trifluoride di-n-butyl etherate, the reaction mixture was stirred and heated at 55° C. to 67.5° C. for 60 minutes. The resulting terpolymer was washed and dried by the procedure described in Example IX to yield 1306 grams of a trioxane/glyoxal-bis-(ethylene glycol acetal)/1,3-dioxolane terpolymer that had an average molecular weight of 19,100 as determined viscosimetrically.

Seven hundred grams of the dry terpolymer were heated with 8750 grams of dimethylformamide and 7.0 grams of cyanoguanidine at 140° C. to 150° C. for four hours. The product was washed with cold water, with hot water, and with acetone and dried under vacuum. There was obtained 531 grams of a stabilized terpolymer.

*Example XI*

A mixture of 392 grams of trioxane, 5 grams of glyoxal-bis-(1,3-propanediol acetal), 5 grams of glyoxal-bis-(neopentyl glycol acetal), 170 grams of cyclohexane, and 0.12 ml. of boron trifluoride diethyl etherate was stirred and heated at a temperature in the range of 47° C. to 65° C. for 20 minutes. The resulting product was washed and dried by the procedure described in Example I to yield 150 grams of a trioxane/glyoxal-bis-(1,3-propanediol acetal)/glyoxal-bis-(neopentyl glycol acetal) terpolymer that had an average molecular weight of 46,000, as determined viscosimetrically. Isolation of glyoxal as the 2,4-dinitrophenylhydrazone and vapor phase chromatographic analysis of the 1,3-propanediol and neopentyl glycol indicated that the mixture of products obtained from the hydrolytic degradation of the terpolymer contained 0.562 percent by weight of glyoxal, 0.12 percent by weight of ethylene glycol, and 1.0 percent by weight of 1,3-propanediol.

*Example XII*

A mixture of 392 grams of trioxane, 9.5 grams of 1,3-dioxolane, 2 grams of glyoxal-bis-(neopentyl glycol acetal), 170 grams of cyclohexane, and 0.12 ml. of boron trifluoride diethyl etherate was stirred and heated at a temperature in the range of 47° C. to 65° C. for 20 minutes. The resulting product was washed and dried by the procedure described in Example I to yield 137 grams of a trioxane/1,3-dioxolane/glyoxal-bis-(neopentyl glycol acetal) terpolymer that had an average molecular weight of 30,800, as determined viscosimetrically. Isolation of glyoxal as the 2,4-dinitrophenylhydrazone and vapor phase chromatographic analysis indicated that the mixture of products obtained from the hydrolytic degradation of the terpolymer contained 0.008 percent by weight of glyoxal and 2.83 percent by weight of ethylene glycol.

*Example XIII*

Anhydrous monomeric formaldehyde was prepared by heating at 117° C.–150° C. a suspension of 200 grams of α-polyoxymethylene in 1100 ml. of the diethyl ether of diethylene glycol which contained 4.5 grams of phosphoric acid. The formaldehyde vapors from this pyrolysis were passed through a series of traps, the first of which was maintained at room temperature, the second at 0° C., and the third and fourth at −15° C. to −22.5° C. The resulting purified anhydrous monomeric formaldehyde was introduced along with a stream of anhydrous nitrogen into a reactor that contained 1000 ml. of freshly-distilled cyclohexane, 10 grams of glyoxal-bis-(ethylene glycol acetal), and 0.3 ml. of boron trifluoride di-n-butyl etherate. The reaction mixture was stirred vigorously and maintained at a temperature in the range of 20° C. to 24° C. during the addition of the monomeric formaldehyde which took place over a period of 90 minutes. The copolymer was separated from the reaction mixture by filtration and added to a mixture of 1.0 gram of anhydrous sodium acetate and 125 grams of acetic anhydride in 1120 grams of methylene diacetate. The mixture was heated gradually to 160° C., maintained at a temperature in the range of 160° C. to 165° C. for one hour, cooled slowly to room temperature, and filtered. The resulting acetylated copolymer was washed with 50 ml. of acetone, with four 500 ml. portions of water, and finally with two 500 ml. portions of acetone and dried under vacuum at 65° C. There was obtained 66.7 grams of an acetylated formaldehyde/glyoxal-bis-(ethylene glycol acetal) copolymer that had an average molecular weight of 13,400, as determined viscosimetrically. After isolating and separating the glyoxal as its 2,4-dinitrophenylhydrazone, vapor phase chromatographic analysis of the glycol separated from its hydrolytic degradation products indicated that the copolymer contained 0.23 percent by weight of combined ethylene glycol. The thermal degradation rate of the acetylated copolymer at 222° C. was 2.8 per hour.

*Example XIV*

Anhydrous monomeric formaldehyde was prepared by heating at 117° C.–150° C. a suspension of 200 grams of α-polyoxymethylene in 1100 ml. of the diethyl ether of diethylene glycol which contained 4.5 grams of phosphoric acid. The formaldehyde vapors from this pyrolysis were passed through the series of traps described in Example XIII and into a reactor that contained 1000 ml. of freshly-distilled cyclohexane, 15 ml. of 1,3-dioxolane, 7 grams of glyoxal-bis-(ethylene glycol acetal), and 0.3 ml. of boron trifluoride di-n-butyl etherate. The reaction mixture was stirred vigorously and maintained at 20° C. to 25° C. during the addition of the formaldehyde which took place over a period of 82 minutes. The resulting terpolymer was separated from the reaction mixture by filtration and then acetylated by the procedure described in Example XIII. There was obtained 41.7 grams of an acetylated formaldehyde/1,3 - dioxolane/glyoxal-bis-(ethylene glycol acetal) terpolymer that had an average molecular weight of approximately 10,000, as determined viscosimetrically. After isolating and separating the glyoxal as its 2,4 - dinitrophenylhydrazone, vapor phase chromatographic analysis of the glycol separated from its hydrolytic degradation products indicated that the terpolymer contained 0.41 percent by weight of combined ethylene glycol.

*Example XV*

The hydrolytic stability at 135° C. of molded bars of the new class of formaldehyde polymers of the invention was determined by the following procedure: Raw polymer was heated at 200° C. for 30 minutes with 0.7 percent by weight of cyanoguanidine and 2 percent by weight of 2,2'-methylene-bis-(4-methyl-6-tert. butylphenol). Tensile bars were then prepared by injection molding the polymer compositions at 300–1200 pounds injection pressure. The hydrolytic stability of the compositions was determined by subjecting a series of the molded bars to steam at 135° C., removing bars periodically, and measuring their properties. For comparative purposes, a homopolymer of formaldehyde and a copolymer of formaldehyde that contained approximately 2.6 percent of combined ethylene glycol (derived from 1,3-dioxolane) were included in the test series. The results of these tests are set forth in Table I.

TABLE I.—HYDROLYTIC STABILITY OF FORMALDEHYDE POLYMERS

| Properties After Exposure to Steam at 135° C. for Indicated Number of Hours | Formaldehyde Polymer | | | | |
|---|---|---|---|---|---|
| | Product of Example I | Product of Example II | Product of Example XII | Formaldehyde Homopolymer | Formaldehyde Copolymer Containing ca. 2.6% of Combined Ethylene Glycol |
| Hours: | | | | | |
| Tensile Strength (p.s.i.): | | | | | |
| Yield Point | 8,350 | 8,250 | 7,600 | | 8,150 |
| Ultimate Tensile Strength | 8,100 | 8,100 | 7,000 | 8,900 | 7,250 |
| Percent Elongation | 39 | 39 | 69 | 19 | 94 |
| 24 Hours: | | | | | |
| Percent Change in Weight | −0.38 | −1.45 | +0.99 | (1) | +3.54 |
| Tensile Strength (p.s.i.): | | | | | |
| Yield Point | 7,150 | | 7,000 | | 7,300 |
| Ultimate Tensile Strength | 7,000 | 7,050 | 6,700 | | 7,100 |
| Percent Retention Tensile Strength | 86 | 85 | 91 | | 89 |
| Percent Elongation | 49 | 36 | 78 | | 85 |
| Percent Retention Elongation | 125 | 92 | 121 | | 90 |
| 48 Hours: | | | | | |
| Percent Change in Weight | −2.06 | −2.96 | −1.64 | | +3.17 |
| Ultimate Tensile Strength (p.s.i.) | 6,600 | 6,500 | 6,450 | | 7,400 |
| Percent Retention Tensile Strength | 79 | 79 | 84 | | 91 |
| Percent Elongation | 26 | 22 | 33 | | 44 |
| Percent Retention Elongation | 67 | 56 | 51 | | 47.5 |
| 72 Hours: | | | | | |
| Percent Change in Weight | −3.87 | −4.76 | −0.34 | | +2.48 |
| Ultimate Tensile Strength (p.s.i.) | 5,650 | 6,400 | 6,750 | | 7,300 |
| Percent Retention Tensile Strength | 68 | 77.5 | 88 | | 89 |
| Percent Elongation | 16 | 21 | 46 | | 48 |
| Percent Retention Elongation | 41 | 54 | 66.5 | | 51 |
| 96 Hours: | | | | | |
| Percent Change in Weight | −4.36 | −7.44 | −0.86 | | +1.28 |
| Ultimate Tensile Strength (p.s.i.) | 5,000 | 5,350 | 6,200 | | 4,100 |
| Percent Retention Tensile Strength | 60 | 65 | 81 | | 50 |
| Percent Elongation | 15 | 15 | 25 | | 9 |
| Percent Retention Elongation | 38.5 | 38.5 | 36 | | 9.5 |

[1] Failed at 16 hours.

*Example XVI*

The hydrolytic properties of the new copolymers and terpolymers of the invention were determined by the following procedure: A 4 gram sample of the powdered polymer was heated with 200 grams of water at the reflux temperature of the mixture for 24 hours. After cooling, the mixture was filtered and the solid polymer dried under vacuum and weighed. The loss in weight is indicative of the degradation of the polymer that occurred during the heating period. The results obtained are given in Table II. For comparative purposes, the test series also included measurements of the hydrolytic properties of trioxane/1,3-dioxolane copolymers and a formaldehyde homopolymer.

TABLE II.—PROPERTIES OF FORMALDEHYDE POLYMERS UPON NONACIDIC HYDROLYSIS

| Polymer: | Percent loss in weight [1] |
|---|---|
| Product of Example I | 3.87 |
| Product of Example II | 2.34 |
| Product of Example III | 2.97 |
| Product of Example IV | 3.43 |
| Product of Example IX | 1.06 |
| Product of Example X | 1.01 |
| Trioxane/1,3 - dioxolane copolymer (mol. wt. 29,300; combined ethylene glycol content, 2.34%) | 6.45 |
| Trioxane/1,3 - dioxolane copolymer (mol. wt. 35,000; combined ethylene glycol content, 3.19%) | 8.19 |
| Acetylated formaldehyde homopolymer (mol. wt. 49,000) | 12.3 |

[1] On heating in boiling water for 24 hours.

*Example XVII*

The resistance of the new formaldehyde polymers of the invention to acid hydrolysis was determined by the following procedure: A 5 gram sample of the powdered polymer was heated with 50 ml. of methanol and 2 ml. of concentrated hydrochloric acid at 40° C.–42° C. until the polymer had dissolved. By way of comparison, the tests were also conducted on trioxane/1,3-dioxolane copolymers which did not contain the dicarbonal. The times required for these various formaldehyde polymers to dissolve are given in Table III.

TABLE III.—PROPERTIES OF FORMALDEHYDE POLYMERS UPON ACID HYDROLYSIS

| Formaldehyde polymer: | Hydrolysis time,[1] hours |
|---|---|
| Trioxane/glyoxal - bis - (ethylene glycol acetal) copolymer (Contains 0.94% combined ethylene glycol and 0.29% combined glyoxal) | 24 |
| Trioxane/glyoxal - bis - (ethylene glycol acetal) 1,3-dioxolane terpolymer (Contains 2.22% combined ethylene glycol and 0.66% combined glyoxal) | 10.75 |
| Trioxane/1,3 - dioxolane copolymer (Contains 11% combined ethylene glycol) | 4 |
| Trioxane/1,3 - dioxolane copolymer (Contains 2.63% combined ethylene glycol and 0.79% combined diethylene glycol) | 4.5 |

[1] Time required for polymer to dissolve in acidic methanol.

Analysis of the data set forth in Tables I, II, and III conclusively demonstrate that those formaldehyde polymers which contain the tetrafunctional units derived from the dicarbonal were more resistant to hydrolysis under both acidic and nonacidic conditions than were either formaldehyde homopolymers or formaldehyde copolymers which did not contain these tetrafunctional units.

I claim:

1. A normally solid, thermally stable, polyacetal terpolymer having an average molecular weight, as determined viscosimetrically, in the range from about 10,000 to about 100,000 and consisting essentially of (a) randomly recurring oxymethylene groups, (b) from about 0.01 to about 7 percent by weight, based on the weight of the terpolymer, of randomly recurring groups derived from a mixture of isomeric dicarbonals having structures represented by the formulas

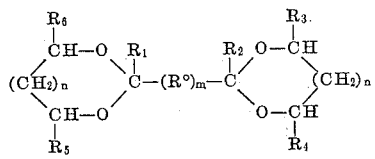

and

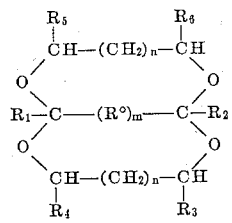

in both of which structures R° represents a divalent radical selected from the group consisting of alkylene, arylene, and aralkylene, $R_1$ and $R_2$ each represent a substituent selected from the group consisting of hydrogen, alkyl groups containing from 1 to 4 carbon atoms, phenyl, and halo-substituted phenyl, $R_3$, $R_4$, $R_5$ and $R_6$ each represent a substituent selected from the group consisting of hydrogen, alkyl groups containing from 1 to 12 carbon atoms, aryl, and aralkyl, $m$ is an integer from 0 to 3, and $n$ is an integer from 0 to 1, and (c) from about 0.1 to about 15 percent by weight, based on the weight of the terpolymer, of randomly recurring oxyalkylene groups derived from a cyclic ether having a structure represented by the formula

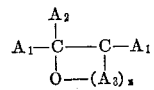

in which $A_1$ and $A_2$ each represent a substituent selected from the group consisting of hydrogen, alkyl groups containing from 1 to 3 carbon atoms, and halo-substituted alkyl groups containing from 1 to 3 carbon atoms, $A_3$ represents a divalent radical selected from the group consisting of methylene, oxymethylene, lower alkyl- or haloalkyl-substituted methylene, oxymethylene, lower alkyl- and haloalkyl-substituted oxymethylene groups, and $z$ represents an integer from 0 to 3, the combined weight of recurring groups derived from both the dicarbonal and the cyclic ether not exceeding 20 percent by weight of the terpolymer.

2. A normally solid, thermally stable, polyacetal terpolymer having an average molecular weight, as determined viscosimetrically, in the range from about 10,000 to about 100,000 and consisting essentially of (a) randomly recurring oxymethylene groups, (b) from about 0.1 to about 15 percent by weight, based on the weight of the terpolymer, of randomly recurring oxyethylene groups, and (c) from about 0.05 to about 4 percent by weight, based on the weight of the terpolymer, of randomly recurring groups derived from a mixture of isomeric dicarbonals having structures represented by the formulas

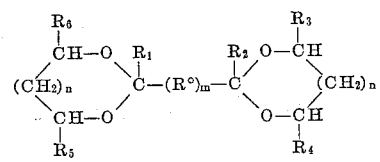

and

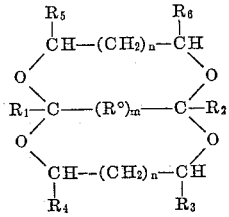

in both of which structures R° represents a divalent radical selected from the group consisting of alkylene, arylene, and aralkylene, $R_1$ and $R_2$ each represent a substituent selected from the group consisting of hydrogen, alkyl groups containing from 1 to 4 carbon atoms, phenyl, and halo-substituted phenyl $R_3$, $R_4$, $R_5$ and $R_6$ each represent a substituent selected from the group consisting of hydrogen, alkyl groups containing from 1 to 12 carbon atoms, aryl, and aralkyl, $m$ is an integer from 0 to 3, and $n$ is an integer from 0 to 1, the combined weight of recurring oxyethylene groups and those derived from the dicarbonal not exceeding 20 percent by weight of the terpolymer.

3. A normally solid, thermally stable, polyacetal terpolymer having an average molecular weight, as determined viscosimetrically, in the range from about 10,000 to about 100,000 and consisting essentially of (a) randomly recurring oxymethylene groups, (b) from about 0.1 to about 15 percent by weight, based on the weight of the terpolymer, of randomly recurring oxyethylene groups, and (c) from about 0.05 to about 4 percent by weight, based on the weight of the polymer, of randomly recurring groups derived from a mixture of isomeric bisacetals having structures represented by the formulas

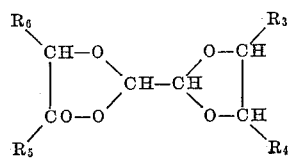

and

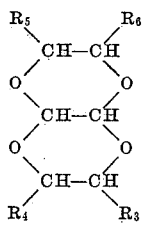

in both of which structures $R_3$, $R_4$, $R_5$ and $R_6$ each represent a substituent selected from the group consisting of hydrogen, alkyl groups containing from 1 to 12 carbon atoms, aryl, and aralkyl, the combined weight of recurring oxyethylene groups and those derived from the bis-acetal not exceeding 20 percent by weight of the terpolymer.

4. A normally solid thermally stable, polyacetal terpolymer having an average molecular weight, as determined viscosimetrically, in the range from about 10,000 to about 100,000 and consisting essentially of (a) randomly recurring oxymethylene groups, (b) from about 0.1 to about 15 percent by weight, based on the weight of the terpolymer, of randomly recurring oxyethylene groups, and (c) from about 0.05 to about 4 percent by weight, based on the weight of the polymer, of randomly recurring groups derived from glyoxal-bis-(ethylene glycol acetal) and having the structure

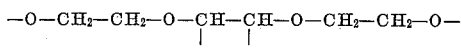

the combined weight of the recurring oxyethylene groups and those derived from glyoxal-bis-(ethylene glycol acetal) not exceeding 20 percent by weight of the terpolymer.

5. A normally solid, thermally stable, polyacetal, terpolymer having an average molecular weight, as determined viscosimetrically, in the range from about 10,000 to about 100,000 and consisting essentially of (a) randomly recurring oxymethylene groups, (b) from about 0.2 to about 3 percent by weight, based on the weight of the terpolymer, of randomly recurring oxyethylene groups, and (c) from about 0.05 to about 4 percent by weight, based on the weight of the terpolymer, of randomly recurring groups derived from a mixture of isomeric dicarbonals having structures represented by the formulas

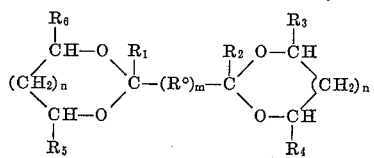

and

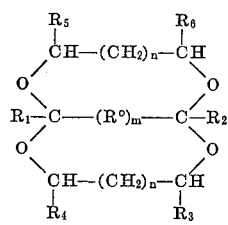

in both of which structures R° represents a divalent radical selected from the group consisting of alkylene, arylene, and aralkylene, $R_1$ and $R_2$ each represent a substituent selected from the group consisting of hydrogen, alkyl groups containing from 1 to 4 carbon atoms, phenyl, and halo-substituted phenyl, $R_3$, $R_4$, $R_5$ and $R_6$ each represent a substituent selected from the group consisting of hydrogen, alkyl groups containing from 1 to 12 carbon atoms, aryl, and aralkyl, $m$ is an integer from 0 to 3, and $n$ is an integer from 0 to 1, the combined weight of recurring oxyethylene groups and those derived from the dicarbonal not exceeding 20 percent by weight of the terpolymer.

6. A normally solid, thermally stable, polyacetal terpolymer having an average molecular weight, as determined viscosimetrically, in the range from about 10,000 to about 100,000 and consisting essentially of (a) randomly recurring oxymethylene groups, (b) from about 0.2 to about 3 percent by weight, based on the weight of the terpolymer, of randomly recurring oxyethylene groups, and (c) from about 0.05 to about 4 percent by weight, based on the weight of the polymer, of randomly recurring groups derived from a mixture of isomeric bis-acetals having structures represented by the formulas

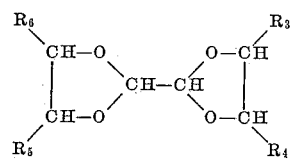

and

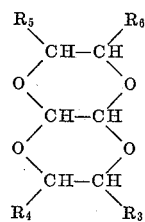

in both of which structures $R_3$, $R_4$, $R_5$ and $R_6$ each represent a substituent selected from the group consisting of hydrogen, alkyl groups containing from 1 to 12 carbon atoms, aryl, and aralkyl, the combined weight of recurring oxyethylene groups and those derived from the bis-acetal not exceeding 20 percent by weight of the terpolymer.

7. A normally solid thermally stable, polyacetal terpolymer having a molecular weight, as determined viscosimetrically, in the range from about 10,000 to about 100,000 and consisting essentially of randomly recurring groups derived from (a) trioxane, (b) 1,3-dioxolane, and (c) glyoxal-bis-(ethylene glycol acetal), the combined weight of recurring groups derived from 1,3-dioxolane and glyoxal-bis-(ethylene glycol acetal) not exceeding 20 percent by weight of the terpolymer.

8. A process for the production of terpolymers which comprises contacting (a) a substantially anhydrous source of formaledhyde selected from the group consisting of monomeric formaldehyde and trioxane, with (b) from about 0.05 to about 20 percent by weight, based on the weight of the formaldehyde source of a mixture of isomeric dicarbonals having structures represented by the formulas

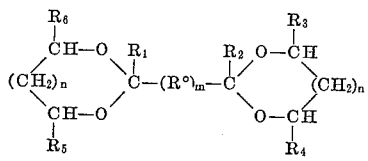

and

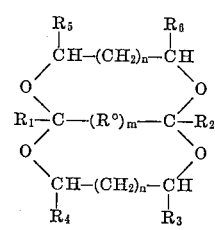

in both of which structures R° represents a divalent radical selected from the group consisting of alkylene, arylene, and aralkylene, $R_1$ and $R_2$ each represent a substituent selected from the group consisting of hydrogen, alkyl groups containing from 1 to 4 carbon atoms, phenyl, and halo-substituted phenyl $R_3$, $R_4$, $R_5$ and $R_6$ each represent a substituent selected from the group consisting of hydrogen, alkyl groups containing from 1 to 12 carbon atoms, aryl, and aralkyl, $m$ is an integer from 0 to 3, and $n$ is an integer from 0 to 1, and (c) from about 0.5 to about 25 percent by weight, based on the weight of the formaldehyde source, of a cyclic ether having a structure represented by the formula

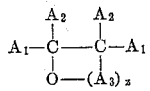

in which $A_1$ and $A_2$ each represent substituents selected from the group consisting of hydrogen, alkyl groups having from 1 to 3 carbon atoms, and halogen-substituted alkyl groups having from 1 to 3 carbon atoms, $A_3$ represents a divalent substituent selected from the group consisting of methylene, oxymethylene, lower alkyl- and haloalkyl-substituted methylene, and lower alkyl- and haloalkyl-substituted oxymethylene groups, and $z$ is an integer in the range of zero to three, in a liquid reaction medium and in the presence of a formaldehyde polymerization initiator at a temperature in the range of from about 0° C. to about 100° C. under substantially anhydrous conditions.

9. A process for the production of terpolymers which comprises contacting trioxane with (a) from about 0.05 to about 20 percent by weight of glyoxal-bis-(ethylene glycol acetal), and (b) from about 0.5 to about 25 percent by weight of 1,3-dioxolane, in a liquid reaction medium and in the presence of a formaldehyde polymerization initiator at a temperature in the range from 20° C. to 70° C. under substantially anhydrous conditions, all percentages being based on the weight of the trioxane.

10. A process for the production of terpolymers in accordance with claim 8, in which the formaldehyde polymerization initiator is a boron trifluoride coordinate complex with an organic compound in which the donor atom is a member of the group consisting of oxygen and sulfur.

11. A process for the production of terpolymers which comprises contacting trioxane with (a) from about 0.1 to about 10 percent by weight of glyoxal-bis-(ethylene glycol acetal), and (b) from about 0.5 to about 25 percent by weight of a cyclic ether selected from the group consisting of 1,3-dioxolane and ethylene oxide, in a liquid reaction medium and in the presence of a catalytic amount of a boron trifluoride coordinate complex with an organic compound in which the donor atom is a member of the group consisting of oxygen and sulfur, at a temperature in the range from about 20° C. to about 70° C. under substantially anhydrous conditions, all percentages being based upon the weight of the trioxane.

References Cited

UNITED STATES PATENTS

| | | | |
|---|---|---|---|
| 2,963,464 | 12/1960 | Cohen et al. | 260—67 |
| 3,027,352 | 3/1962 | Walling et al. | 260—67 |
| 3,223,713 | 12/1965 | Kesslin et al. | 260—340.7 |
| 3,232,907 | 2/1966 | Reinhardt | 260—67 |
| 3,256,246 | 6/1966 | Gutweiler et al. | 260—67 |
| 3,293,219 | 12/1966 | Gottesman et al. | 260—67 |

WILLIAM H. SHORT, *Primary Examiner.*

L. M. PHYNES, *Assistant Examiner.*